(12) United States Patent
Comradd

(10) Patent No.: US 11,412,194 B2
(45) Date of Patent: Aug. 9, 2022

(54) METHOD AND SYSTEM FOR EMPLOYING DEPTH PERCEPTION TO ALTER PROJECTED IMAGES ON VARIOUS SURFACES

(71) Applicant: Dana Comradd, Rockwall, TX (US)

(72) Inventor: Dana Comradd, Rockwall, TX (US)

( * ) Notice: Subject to any disclaimer, the term of this patent is extended or adjusted under 35 U.S.C. 154(b) by 0 days.

(21) Appl. No.: 16/525,480

(22) Filed: Jul. 29, 2019

(65) Prior Publication Data
US 2020/0059633 A1 Feb. 20, 2020

Related U.S. Application Data

(60) Provisional application No. 62/719,150, filed on Aug. 17, 2018.

(51) Int. Cl.
| | | |
|---|---|---|
| *H04N 7/18* | (2006.01) | |
| *H04N 9/31* | (2006.01) | |
| *G06F 16/54* | (2019.01) | |
| *G06T 7/70* | (2017.01) | |
| *G06T 7/50* | (2017.01) | |

(52) U.S. Cl.
CPC .......... *H04N 9/3185* (2013.01); *G06F 16/54* (2019.01); *G06T 7/50* (2017.01); *G06T 7/70* (2017.01); *H04N 9/3188* (2013.01)

(58) Field of Classification Search
CPC .................................................. H04N 9/3185
USPC ........................................................ 348/135
See application file for complete search history.

(56) References Cited

U.S. PATENT DOCUMENTS

| | | | | |
|---|---|---|---|---|
| 9,451,245 | B1* | 9/2016 | Darling | G06T 19/20 |
| 10,237,530 | B1* | 3/2019 | Brailovskiy | H04N 13/271 |
| 10,306,152 | B1* | 5/2019 | Chu | H04N 5/2351 |
| 10,616,471 | B2* | 4/2020 | Molgaard | G06T 7/50 |
| 2006/0044289 | A1* | 3/2006 | Yee | G09G 5/006 345/204 |
| 2010/0315491 | A1* | 12/2010 | Carter | G03B 15/10 348/51 |
| 2011/0111849 | A1* | 5/2011 | Sprague | H04N 9/3173 463/31 |
| 2011/0242332 | A1* | 10/2011 | McFadyen | H04N 9/3194 348/189 |
| 2012/0063680 | A1* | 3/2012 | Daisy | G06T 3/0068 382/165 |
| 2012/0194517 | A1* | 8/2012 | Izadi | G06T 7/20 345/420 |
| 2016/0334938 | A1* | 11/2016 | Kang | G03B 21/28 |

(Continued)

*Primary Examiner* — Leron Beck
(74) *Attorney, Agent, or Firm* — Andrew Morabito

(57) ABSTRACT

The present invention is a computer implemented method for projecting an image, comprising: providing an electronic device, wherein the electronic device has an image sensing component, a processing component, and a projecting component; capturing, by one or more processors, at least one image of an environment within the visible space of the projecting component of the electronic device; generating, by one or more processors, a depth map of the visible space of the environment; selecting, by one or more processors, an image to be projected on a portion of the visible space; altering, by one or more processors, the image based on the generated depth map of the visible space relative to the selected portion of the visible space; and projecting, by one or more processors, the image on the portion of the visible space.

12 Claims, 10 Drawing Sheets

(56) References Cited

U.S. PATENT DOCUMENTS

2016/0358382 A1* 12/2016 Lee .................. H04N 13/363
2017/0345183 A1* 11/2017 Chen ..................... G06T 7/55
2018/0232859 A1*  8/2018 Siddiqui ................ G06T 7/50

* cited by examiner

METHOD AND SYSTEM FOR EMPLOYING DEPTH PERCEPTION TO ALTER PROJECTED IMAGES ON VARIOUS SURFACES

CROSS-REFERENCE TO RELATED APPLICATIONS

This application is a continuation of U.S. application No. 62/719,150 filed Aug. 17, 2018. The disclosure of the prior applications is considered part of (and is incorporated by reference in) the disclosure of this application.

BACKGROUND

This disclosure relates generally methods for obtaining three dimensional measurements of objects and space, and particularly to a method, computer program and computer system for scanning an environment and determining a scaled projection over the space.

In many parts of the world there is a longstanding tradition of decorating homes' and business' exteriors with lights, wreaths and figurines. A projection of images on a buildings' flat surface is an increasingly popular way to express holiday spirit. A number of commercially-available projectors are capable of projecting still images on garage doors, walls, and entryways. These projectors generally display a holiday-themed image which is printed on a slide inserted in the projection units. A motorized projector may also display a number of varied still images in succession.

Interactive decorations are more popular because they spark notice by viewers. Outdoor lighted yard displays achieve animation by activating select lamps on light strings to emit light in timed sequences. An increasingly popular holiday decoration is a projection show that is capable of displaying a simulation of moving images. Various kinds of projected images may be displayed with a projector, including graphics, animations and other projected optical effects. Although such systems offer great entertainment value, they are also prohibitively expensive for most households. These interactive decorations are used inside, outside, and for various holidays, parties, events, shows, presentations for the like.

The problem with the existing projectors and interactive decorations, images, or videos is that they are not properly scaled or adjusted based on the size, shape, and depth of the space in which the interactive decoration is displayed. While displaying the interactive decoration on a flat surface does not provide this problem, many homes and business have depth or an interior space has many objects, walls, rooms, and items, that add depth to the space making the interactive decoration scaled incorrectly distorting the interactive decorations.

Therefore, it is desired for a method, computer program, or computer system to measure the range of the surfaces and features within the projectable space, has projected images, videos or interactive displays that are correctly scaled and altered so that when views have minimal distortion or warping.

SUMMARY

In a first embodiment, the present invention is a computer implemented method for projecting an image, comprising: providing an electronic device, wherein the electronic device has an image sensing component, a processing component, and a projecting component; capturing, by one or more processors, at least one image of an environment within the visible space of the projecting component of the electronic device; generating, by one or more processors, a depth map of the visible space of the environment; selecting, by one or more processors, an image to be projected on a portion of the visible space; altering, by one or more processors, the image based on the generated depth map of the visible space relative to the selected portion of the visible space; and projecting, by one or more processors, the image on the portion of the visible space.

In a second embodiment, the present invention is a computer program product for projecting an image, the computer program product comprising a computer readable storage medium having program instructions embodied therewith, the program instructions executable by a computing device to cause the computing device to: provide an electronic device, wherein the electronic device has an image sensing component, a processing component, and a projecting component; program instructions to capture at least one image of an environment within the visible space of the projecting component of the electronic device; program instructions to generate a depth map of the visible space of the environment; program instructions to select an image to be projected on a portion of the visible space; program instructions to alter the image based on the generated depth map of the visible space relative to the selected portion of the visible space; and program instructions to project the image on the portion of the visible space.

In a third embodiment, the present invention is a computer system for projecting an image, the computer program product comprising: one or more computer processors, one or more computer readable storage media, and program instructions stored on the one or more computer readable storage media for execution by, at least one of the one or more processors, the program instructions comprising: provide an electronic device, wherein the electronic device has an image sensing component, a processing component, and a projecting component; program instructions to capture at least one image of an environment within the visible space of the projecting component of the electronic device; program instructions to generate a depth map of the visible space of the environment; program instructions to select an image to be projected on a portion of the visible space; program instructions to alter the image based on the generated depth map of the visible space relative to the selected portion of the visible space; and program instructions to project the image on the portion of the visible space.

BRIEF DESCRIPTION OF THE DRAWINGS

Referring now to the drawings in which like reference numbers represent corresponding parts throughout.

DETAILED DESCRIPTION

Figure 1:
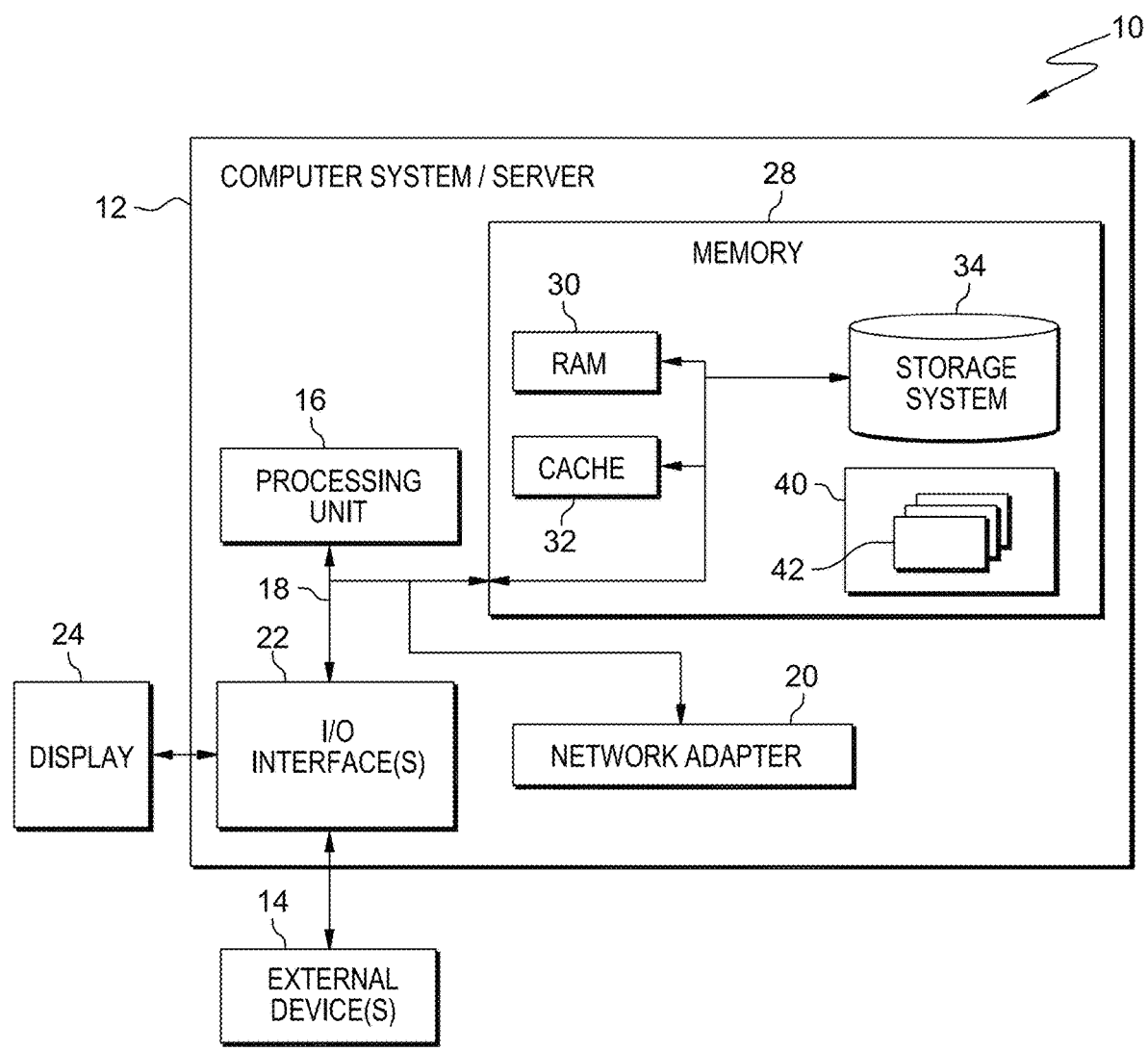
FIG. 1 depicts a cloud computing node according to an embodiment of the present invention.

The present invention generally relates to displaying a image, video, interactive display, or other still or moving projection (hereinafter referred to as image) on an interior or exterior surface(s), wherein the projected visuals is properly scaled based on the surface(s) so that the projected image is not distorted or warped when viewing from various angles. Further, the operator has the ability to adjust which surfaces and areas of the surface(s) which are within the range of what the projector can display. Advantageously, altering the projected image which is being projected based on the depth, number of surfaces, and foreground/background features allows a clear, readable, and viewable projected image displayed so that people can clearly view the projected image.

In accordance with aspects of the present invention, a person may want to project a holiday scene on the front of their house. Through the use of a present invention, with the integrated mechanical and electrical components, is able to place the projector facing their home. The projector maps the depth and fields of the home and is then able to display holiday scenes on various the many surfaces and features within the projectors field of view and adjust projected image to reduce distortion and warping so that viewers see the projected image correctly from all angles.

Further, in an interior space, with the proper projection device, a person is able to scan the viewable environment and display various images, live feeds, information, or advertisements, on various surfaces within the viewable environment. Each surface can display or handle a different projected image and the projected image is scaled and adjusted to be clear, visible, and legible to viewers As described herein, existing systems do not solve the technical problem of scaling or adjusting the projection of an projected image on a surface, so that the projected image is without distortion or warping, and do not identify various surfaces within the area of the projection device to allow for more than one independent projected image to be displayed on each surface or feature within the projectable field.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
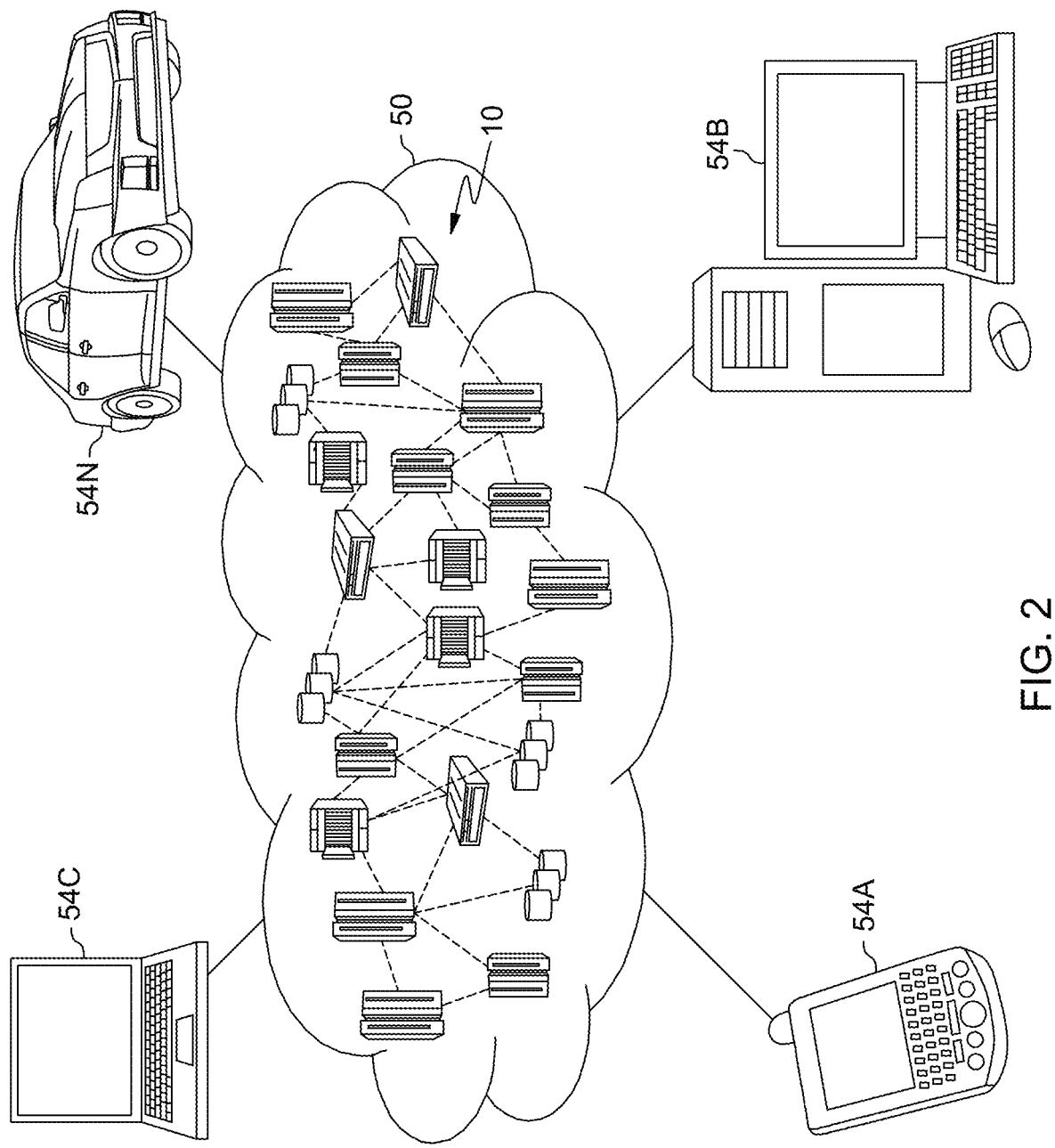
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
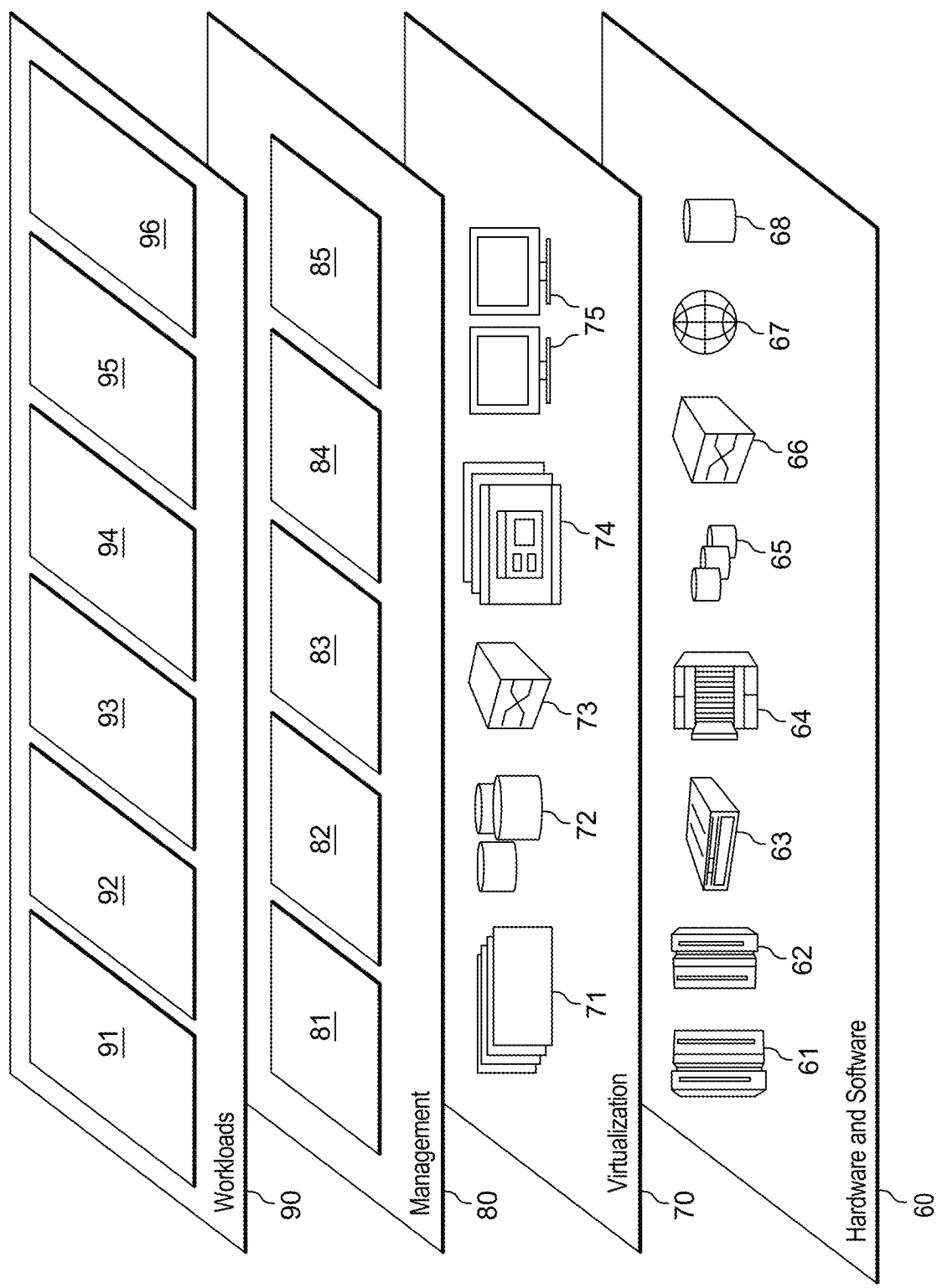
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: special mapping 91; software development 92; virtual imaging of displays 93; data analytics processing 94; transaction processing 95; and display generation 96.

Referring back to FIG. 1, the Program/utility 40 may include one or more program modules 42 that generally carry out the functions and/or methodologies of embodiments of the invention as described herein. Specifically, the program modules 42 may monitor real-time parking facility camera data, receive vehicle identification information for a vehicle entering a parking facility, identify driver and vehicle information based on the vehicle identification information, identify open parking spaces based on the real-time parking facility camera data, determining attributes of the open parking spaces, score the open parking spaces based on the attributes, the vehicle information, and the driver information, select a particular open parking space based on the scoring, determine navigation directions to the selected parking space, and outputting navigation directions and information for the selected parking space, e.g., to a user device of the driver and/or to a vehicle interface system, such as a vehicle navigation system. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a server as shown in FIG. 4.

Figure 4:
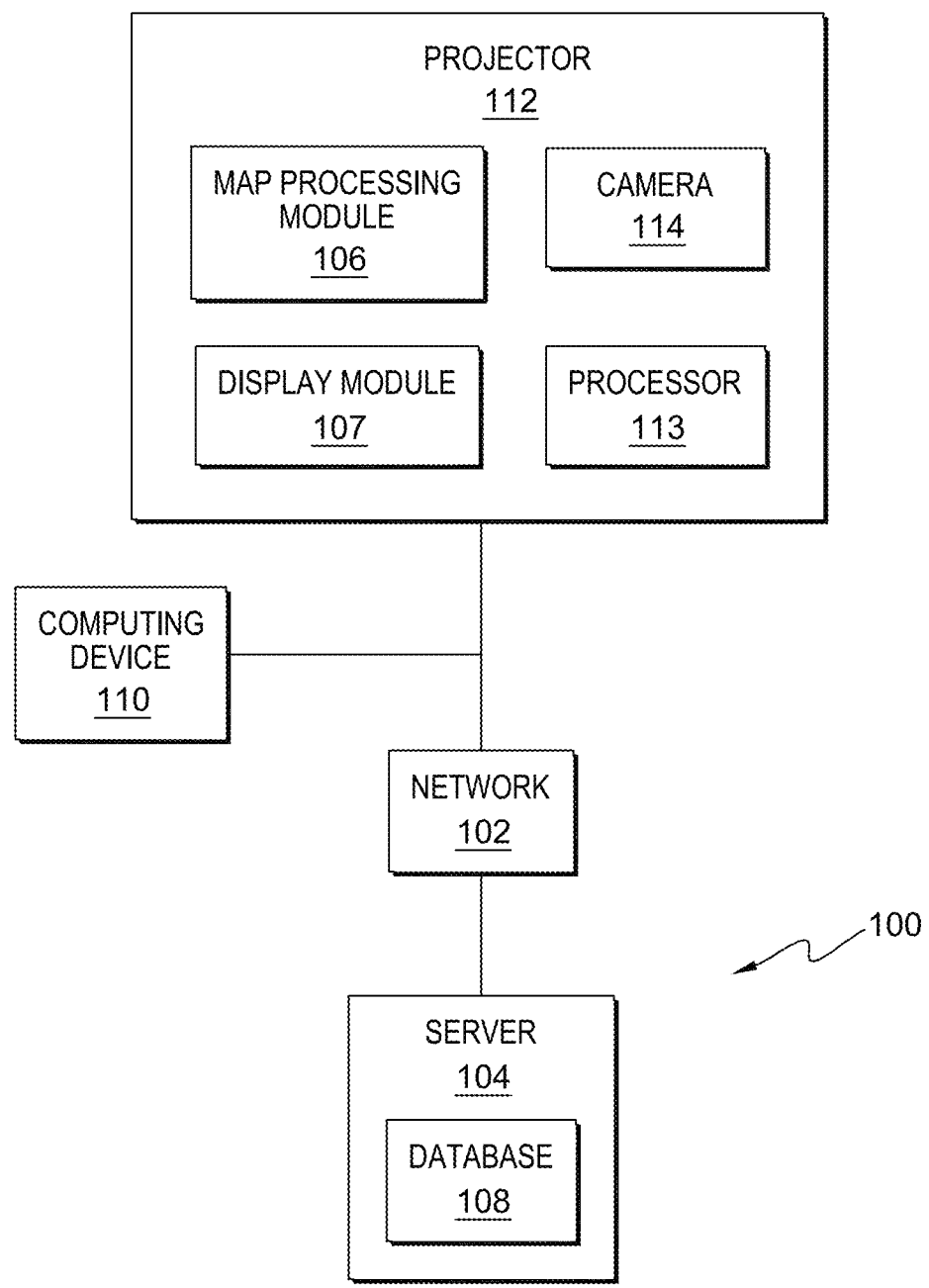
FIG. 4 depicts a block diagram depicting a computing environment according to an embodiment of the present invention.

FIG. 4 depicts a block diagram of a computing environment 100 in accordance with one embodiment of the present invention. FIG. 1 provides an illustration of one embodiment and does not imply any limitations regarding the viewable environment in which different embodiments may be implemented.

In the depicted embodiment, computing environment 100 includes network 102, computing device 110, projection device 106, server 104. Computing environment 100 may include additional servers, computers, or other devices not shown.

Network 102 may be a local area network (LAN), a wide area network (WAN) such as the Internet, any combination thereof, or any combination of connections and protocols that can support communications between computing device 110, projector 112, and server 104 in accordance with embodiments of the invention. Network 102 may include wired, wireless, or fiber optic connections.

Computing device 110 may be a management server, a web server, or any other electronic device or computing system capable of processing program instructions and receiving and sending data. In some embodiments, computing device 110 may be a laptop computer, tablet computer, netbook computer, personal computer (PC), a desktop computer, or any programmable electronic device capable of communicating with projector 112 and server 104 via network 102. In other embodiments, computing device 110 may represent a server computing system utilizing multiple computers as a server system, such as in a cloud computing environment. In another embodiment, computing device 110 represents a computing system utilizing clustered computers and components to act as a single pool of seamless resources. In some embodiments, computing device 110 may include any combination of database 108, map processing module 106, and projected image display module 107. computing device 110 may include components, as depicted and described in further detail with respect to FIG. 1.

Projector 112 provides the component which is able to scan the viewable space based on the camera 114 and other features (e.g. lens), assess the depth, features, and surfaces within the viewable space, and generate the image which is projected over the features or surfaces within the viewable space. The projector 112 has at least one camera 114 to capture images of the viewable space. The projector 112 has at least one projection element, wherein the projection element is able to generate the projected image while are to be displayed. In some embodiments, the projector 112 is a single component with all elements contained within a housing. In some embodiments, the projector 112 has a controller, which controls the camera 114 and the projection element(s) or the mechanical and electrical components which control these elements. In some embodiments, the projector 112 has an internal image processing system and image generation system. In other implementations, parts (or all) of the image capturing system, such as the camera 114 and projector element, may be a separate device that couples together. The projector 112 is connected to computing device 110 and server 104 through network 102. projector 112 may include components, as depicted and described in further detail with respect to FIG. 1.

Server 104 may be a management server, a web server, or any other electronic device or computing system capable of processing program instructions and receiving and sending data. In another embodiments server 104 may be a laptop computer, tablet computer, netbook computer, personal computer (PC), a desktop computer, or any programmable electronic device capable of communicating via network 102. In one embodiment, server 104 may be a server computing system utilizing multiple computers as a server system, such as in a cloud computing environment. In one embodiment, server 104 represents a computing system utilizing clustered computers and components to act as a single pool of seamless resources. In the depicted embodiment database 108, map processing module 16 and display module 107 are located on server 104. Server 104 may include components, as depicted and described in further detail with respect to FIG. 1.

Map Processing Module 106 performs the various operations associated with the mapping of the viewable space in which the projected image is displayed on or in. The map processing module 106 uses the projector 112 to identify the various surfaces, foreground/background features, and the like within the viewable space of the projector 112. By analyzing the viewable space and the various surfaces and features of the viewable space, the map processing module 106 is able to determine how to project an projected image within the viewable space to alter the projected image so that based on the location of the projector 112 and the size, distance, angle, and other characteristics of the various surfaces and features within the viewable space, so that the projected image appears with minimal distortion and warping. In the depicted embodiment, the Map Processing Module 106 resides on server 104. In one embodiment, Map Processing Module 106 resides on computing device 110. In other embodiments, Map Processing Module 106 may be located on another server or computing device, provided Map Processing Module 106 has access to database 108, display module 107 projector 112 and computing device 110.

Display module 107 projects the projected image on to the various surfaces or subjects of the viewable space captured and analyzed by the various operations associated with the mapping of the viewable space in which the projected image is displayed on or in. The Display module 107 uses the projection element of the projector 112 to generate the projected image on the various portions of the viewable space. In some embodiments, the Display module 107 communicates with various projection elements to generate more than one projected image with the viewable space. The Display module 107 uses the information collected from the map processing module 106 to properly adjust the projected image so that is appears with minimal distortion or warping. This process may require the control of various lenses or mechanical components of the projector 112. In the depicted embodiment, the Display module 107 resides on server 104. In one embodiment, the Display module 107 resides on computing device 110. In other embodiments, the Display module 107 may be located on another server or computing device, provided Display module 107 has access to database 108, map processing module 106, projector 112, and computing device 110.

Database 108 may be a repository that may be written to and/or read by computing device 110, projector 112, map processing module 106, and display module 107. In one embodiment, database 108 is a database management system (DBMS) used to allow the definition, creation, querying, update, and administration of a database(s). In the depicted embodiment, database 108 resides on server 104. In other embodiments, database 108 resides on another server, or another computing device, provided that database 108 is accessible to computing device 110, projector 112, map processing module 106, and display module 107.

Figure 5:
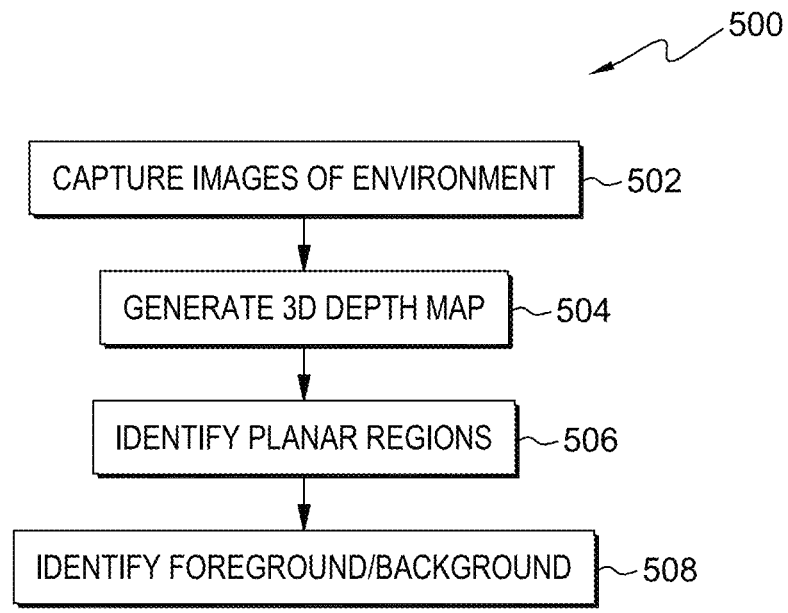
FIG. 5 depicts a flowchart of the operational steps taken by a program to analyze the viewable environment using a computing device within the computing environment of FIG. 1 according to an embodiment of the present invention.

FIG. 5 shows flowchart 500 depicting a method according to the present invention. The method(s) and associated process(es) are now discussed, over the course of the following paragraphs, with extensive reference to FIG. 4, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The map processing module 106 provides the analysis of the viewable space which is viewable by the camera 114 and is within the viewable space which the projector element is able to project the projected image onto the surface or features of the viewable environment. By analyzing the viewable space within the viewable range, the map processing module 106 is able to determine the distance, angle, pitch, direction, irregularities, and other characteristics of the various surfaces and features to determine how to properly display a projected image on the surface or features. In many cases displaying more than one projected image within the viewable area. In some embodiments, the map processing module 106 is able to account for objects passing in front of the viewable space, or objects which are in a state of motion within the viewable space.

In step 502, the map processing module 106 captures images of the viewable environment. Through the camera 114 of the projector 112, the map processing module 106 receives a plurality of images captured by the camera 114. The captured images may be structured light images, 3-dimensional scans, or the like to obtain the geometry of the viewable environment. The process of capturing the images with structured light imaging, the camera 114 projects a sequence of patterns over the viewable environment and simultaneously capture images of the viewable environment. In additional embodiments, various methods to capture the depth of the viewable environment relative to the position of the projector 112. In some embodiments, the map processing module 106 performs a scan of the environment within the known limits of the projector 112. The scan may be, but not limited to a sweeping scan of the environment with or without limitations set by either the user, the map processing module 106, or the display module 107.

Figure 7:
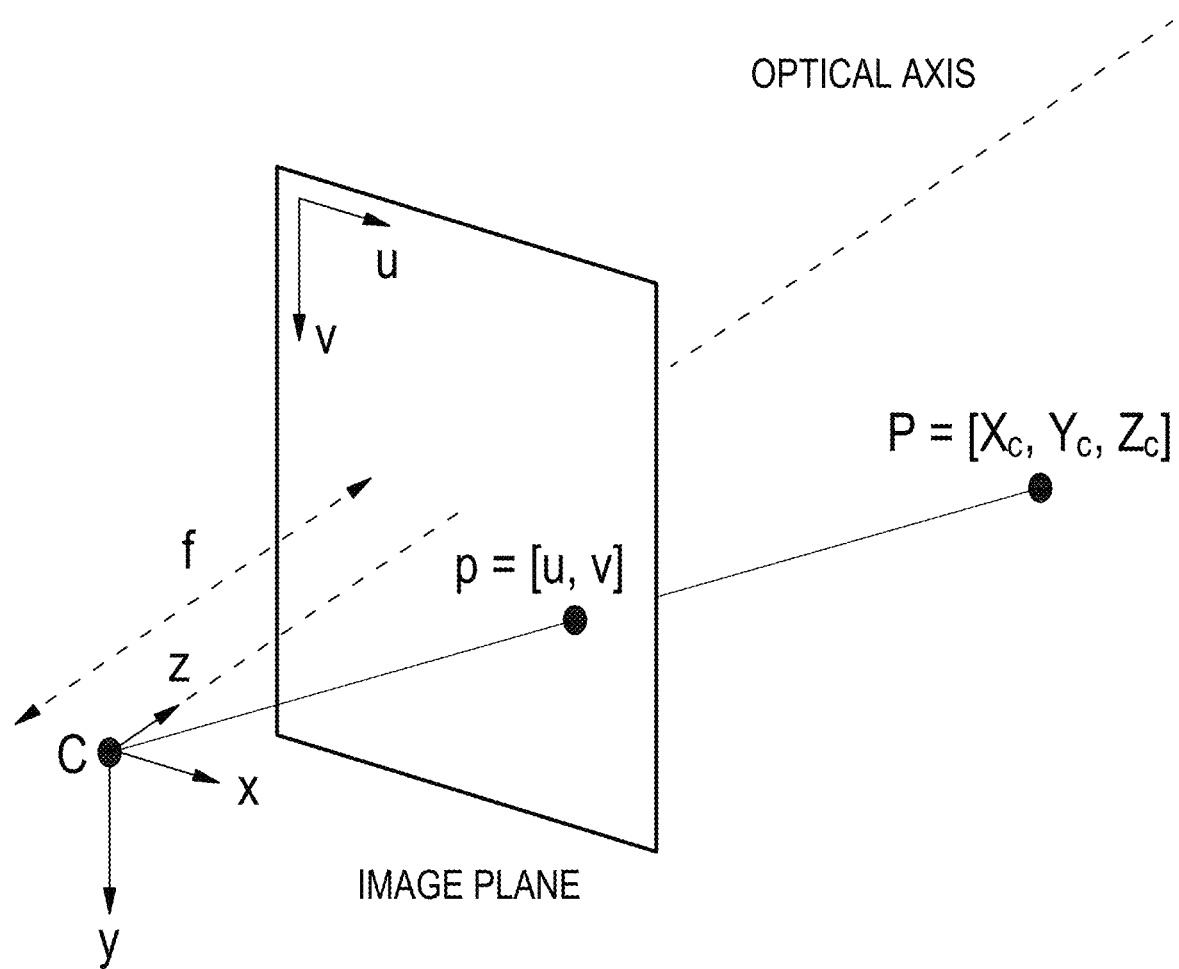
FIG. 7 depicts an illustration of the mapping of a space, according to an embodiment of the present invention.

In some embodiment, depicted in FIG. 7, the map processing module 106 calculates the surface and position of each pixel in the image and compares these values to the proximate pixels to generate the 3D depth map. The equation below shows the relation between pixel coordinates (in two dimensions and three dimensions) and camera intrinsic matrices:

$$s \cdot [uv1] = [f0 \ cx0 \ fcy001] \cdot [X_C Y_C Z_C]$$

In some embodiments, the mapping consists of intrinsic parameters, represented by a camera and a projector matrices, and extrinsic parameters represented by a rotation matrix and a translation vector.

Figure 8:
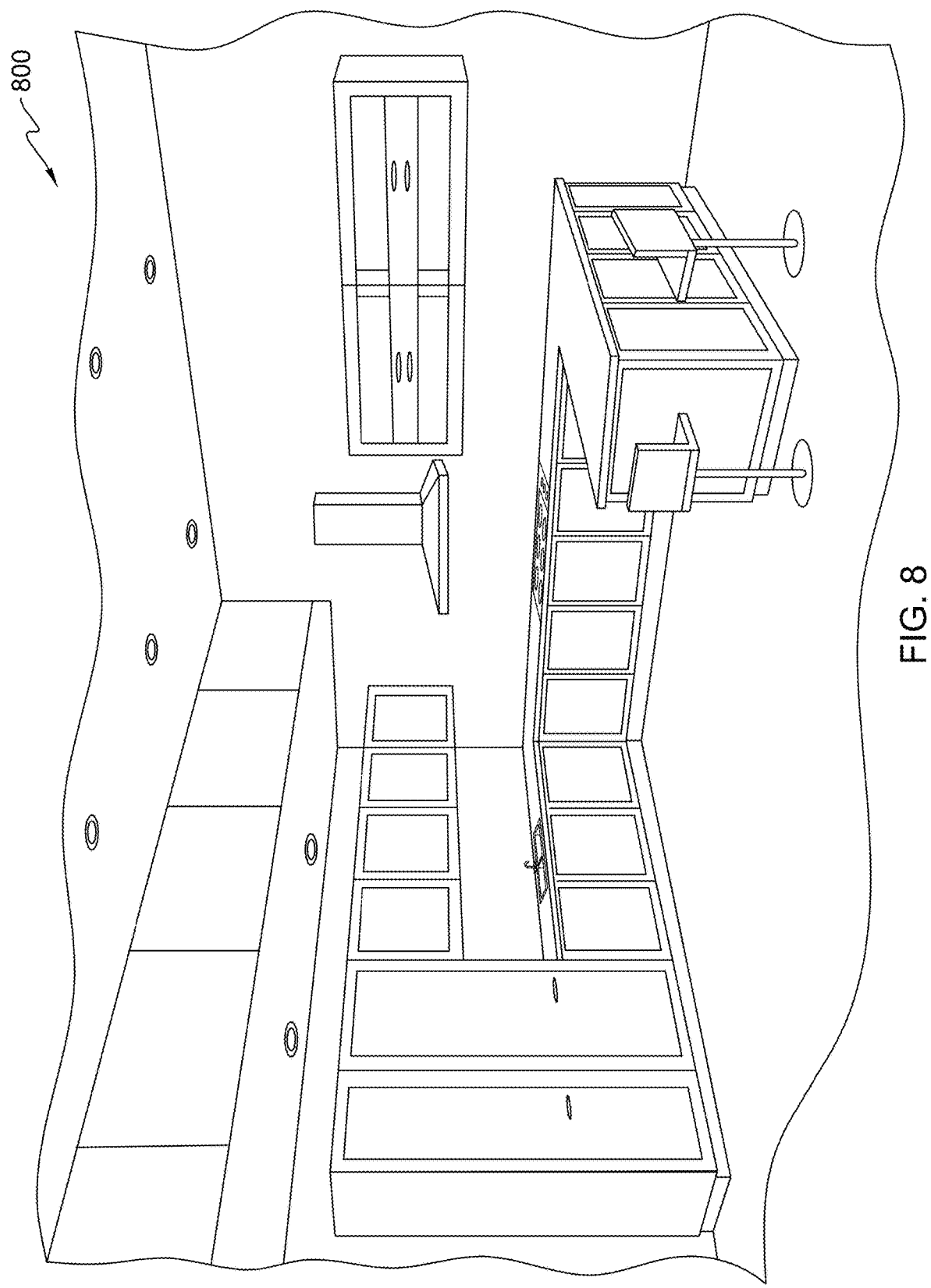
FIG. 8 depicts an illustration of the calculated space, according to an embodiment of the present invention.
Figure 9:
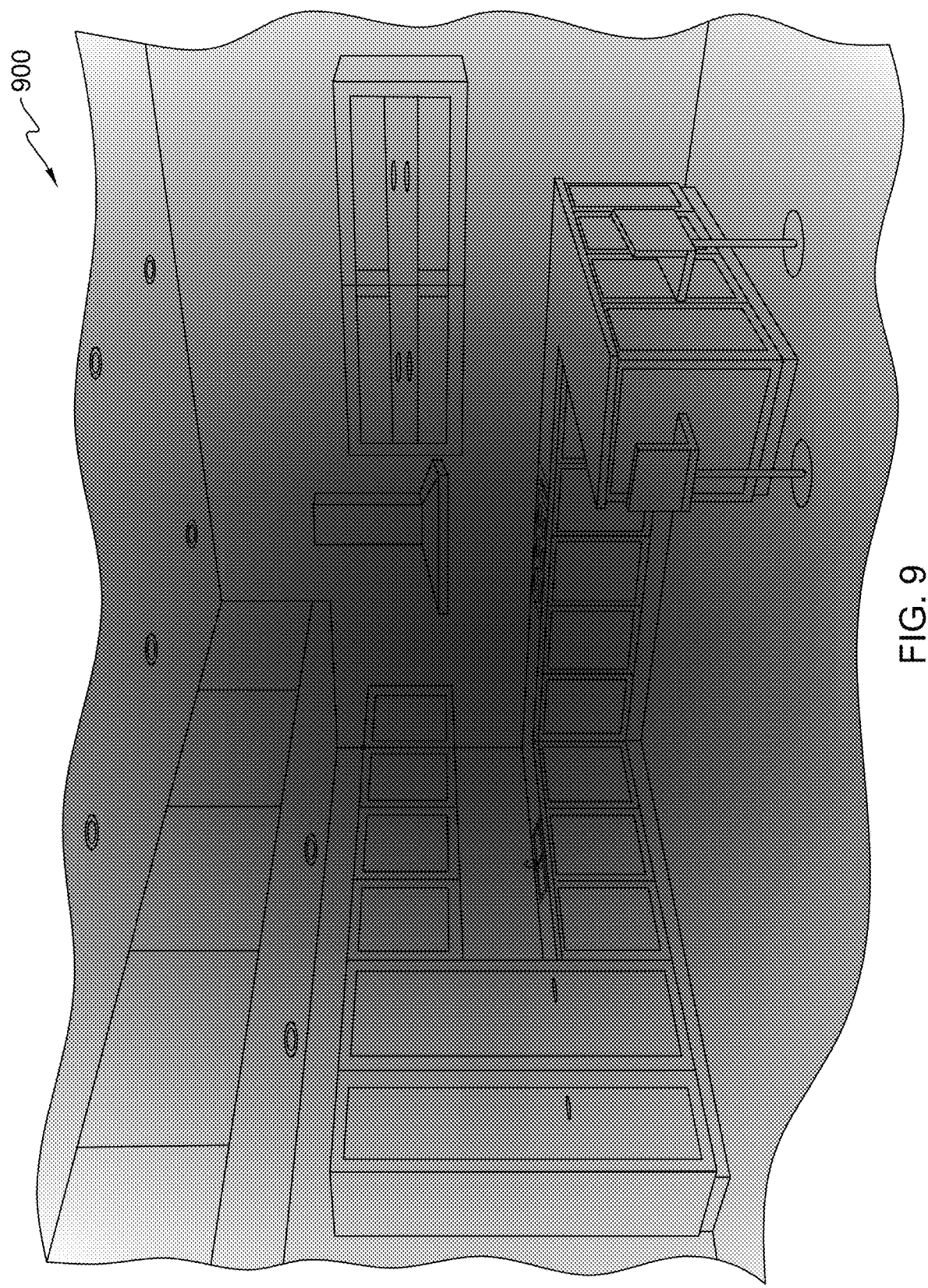
FIG. 9 depicts an altered illustration of the calculated space, according to an embodiment of the present invention.

In step 504, the map processing module 106 generates a 3-dimensional depth map of the viewable environment. The 3D depth map is a representation of the scanned geometry in the viewable space. In some embodiments, 3D depth map may be converted to a point cloud, or a set f data points in viewable space. In additional embodiments, the 3D depth map is depicted in light and dark areas showing distance between surfaces and objects and the projector 112. An example of the 3D scans is depicted in FIG. 8. The 3D depth map may be converted to a colored image which can be sent to the computing device 110, so a user can see what the map processing module 106 has created. An example of the 3D scans is depicted in FIG. 9. This allows the user to review the 3D depth map to confirm that the 3D depth map is an accurate representation of the viewable space. In some embodiments, the generated depth map is in the form of a gradient scale, where the most distant detected space is darkest and the closest detected space is lightest. In some embodiments, the map processing module 106 detects only space within the projectable depth of project 112.

Figure 10:
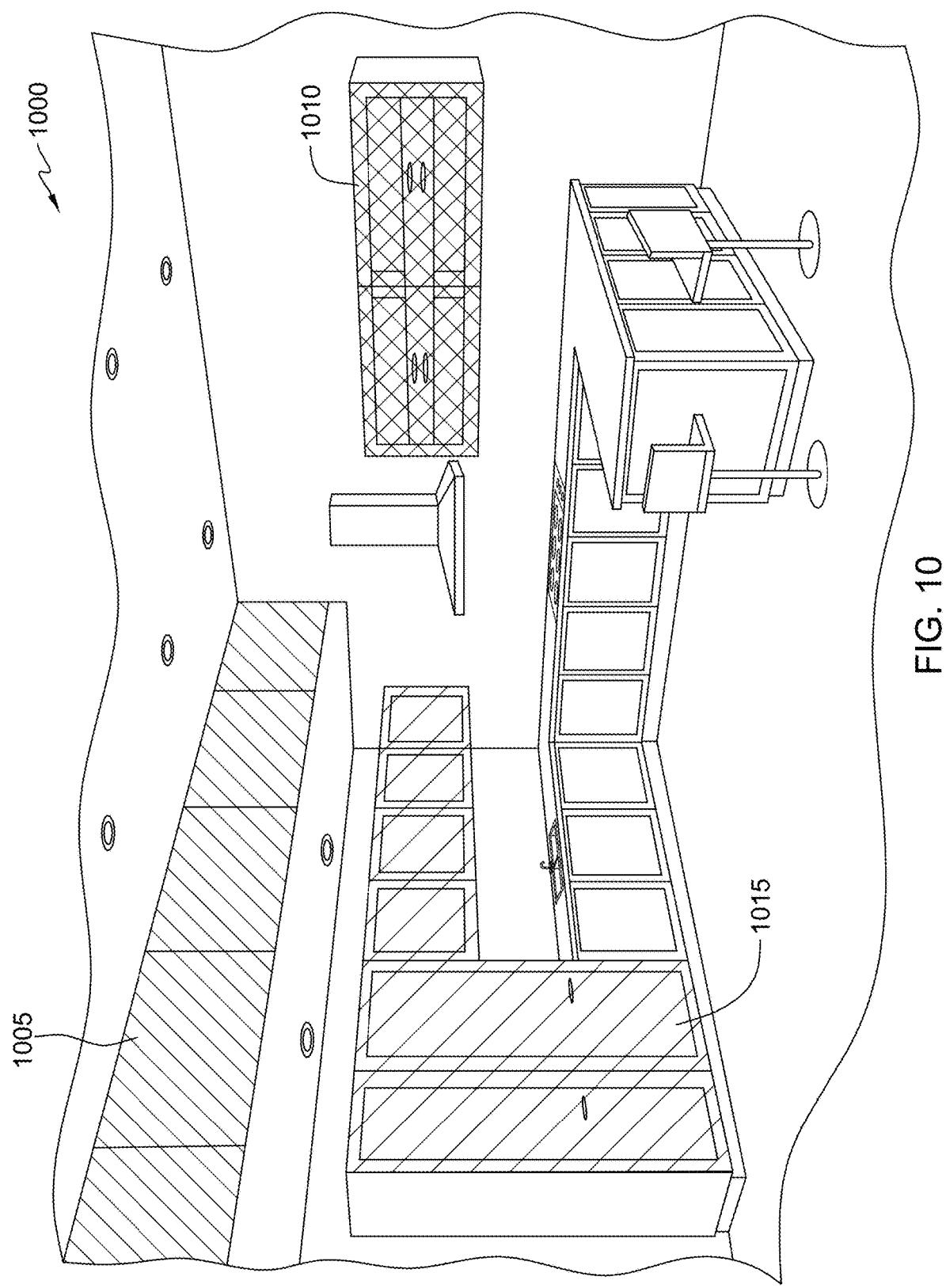
FIG. 10 depicts an altered illustration of the calculated space depicted various surfaces, according to an embodiment of the present invention.

In step 506, the map processing module 106 identifies the surfaces within the viewable environment. Based on the generated 3D depth map, the surfaces of the mapped viewable environment are identified and categorized for the future projection of the image on these surfaces. An example of the surfaces is depicted in FIG. 10. Based on the calculations of the pixel locations and the depth map, the map processing module 106 is able to detect these surfaces where the projected image can be properly displayed. The surfaces may be calculated based on a minimum and maximum length, width, or height dimensions based on the limitations of the projector 112. Surfaces which do not meet the minimum and maximum requires are ignored by the map processing module 106. In some embodiments, there are minimal requirements for an area of the mapped viewable environment to be considered a surface. This may be based on size, shape, distance, and also based on the limitations of the projector 112. For example, if the projector 112 is only able to adjust the projected image so much based on the angle and distance of the surface from the projector 112. In some embodiments, based on the surface distance and angle from the projector 112, the map processing module 106 is able to determine the necessary warping or keystone correction calculation so the projector 112 is able to properly adjust the projected image, so that is appears flat and proportionate across the surface. In some embodiments, the map processing module 106 is able to generate a plurality of surfaces, wherein each region can be a different projected image.

In some embodiments, the map processing module 106 uses machine learning techniques to detect the planar regions, or surfaces which the projector 112 is able to project an image on. In a preferred example, an artificial neural network regression is used as the machine-learning model. Other machine learning models can be used, including but not limited to support vector regression, supervised nonlinear regression, support vector regression, a nonlinear Gaussian process regression model, shallow or deep convolutional neural network, shift-invariant neural network, deep learning, deep belief networks, nearest neighbor algorithm, association rule learning, inductive logic programming, reinforcement learning, representation learning, similarity learning, sparse dictionary learning, manifold learning, dictionary learning, boosting, Bayesian networks, case-based reasoning, Kernel machines, subspace learning, Naive Bayes classifiers, ensemble learning, random forests, decision trees, a bag of visual words, and statistical relational learning.

Through the data collected and the machine learning techniques or models, the map processing module 106 is able to better detect surfaces either through data identifying a previously analyzed space, or through the improved ability to identify surfaces, foreground, and background objects. The collection and processing of data assists with improving the module's ability to accurately predict these surfaces.

Figure 11:
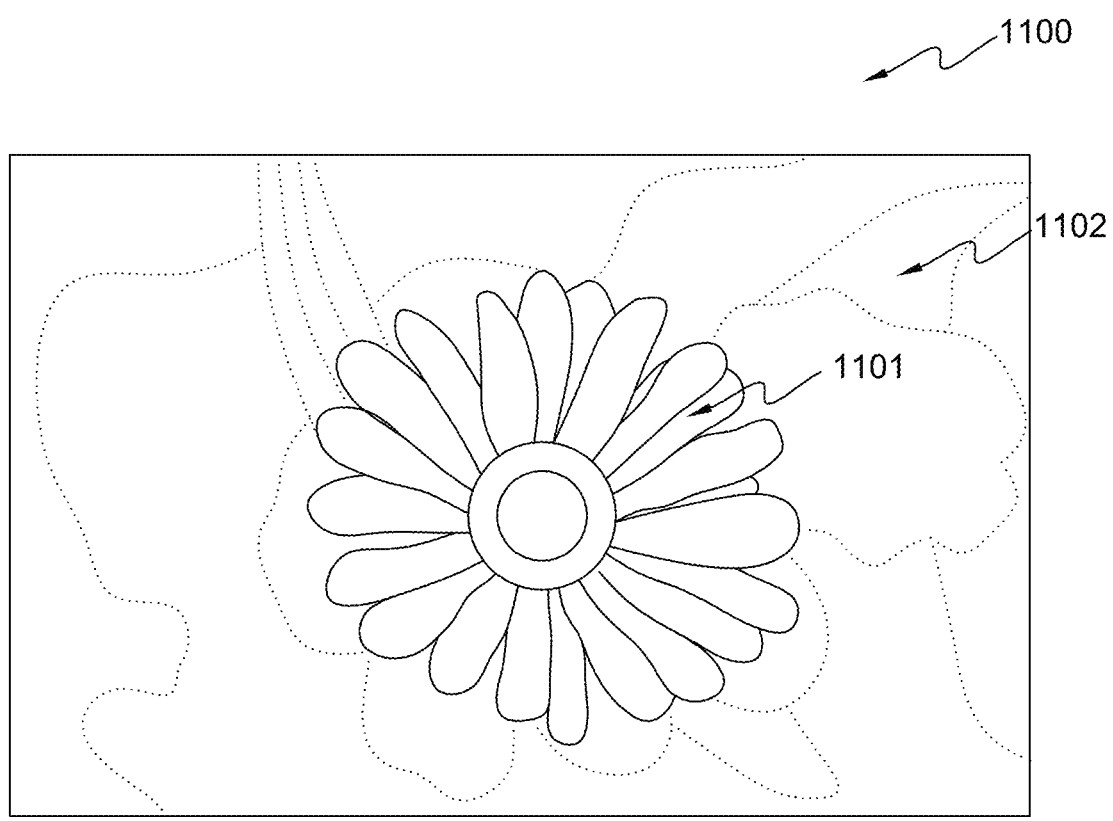
FIG. 11 depicts an altered illustration of the calculated space depicted foreground/background features, according to an embodiment of the present invention.

In step 508, the map processing module 106 identifies foreground and background features of the viewable environment. In some embodiments, a certain type of projected image may require a foreground/background setup. Through a segmentation process of the depth map, the map processing module 106 is able to identify foreground features and background features. An example of the foreground feature is depicted in FIG. 11. This foreground vs. background provides the ability to create complex geometries of the projected image, so that the projected image interacts with a feature in the foreground or the background. In some embodiments, certain requirements are set to establish the foreground from the background. For example, the distance between the features, the distance of the features from the projector 112, and the requirements of the projected image to give certain appearances or perspectives. For example, to have snow fall on a free-standing features (e.g. tree) in the foreground and not be displayed on an features (e.g. house) in the background. Similar to step 506, the map processing module 106 is able to use machine learning techniques to detect the foreground and background in the projectable space.

Figure 6:
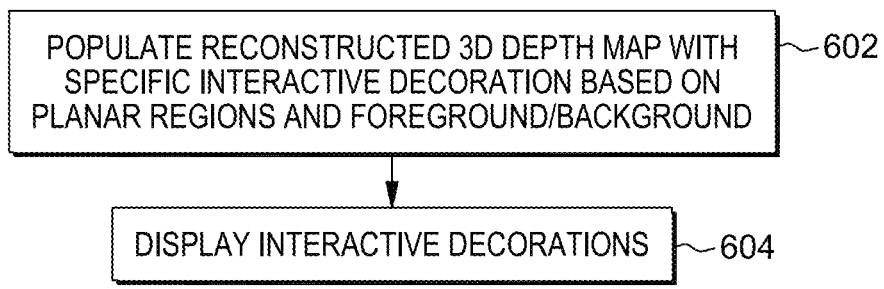
FIG. 6 depicts a flowchart of the operational steps taken by a program to analyze the viewable environment using a computing device within the computing environment of FIG. 1 according to an embodiment of the present invention.

FIG. 6 shows flowchart 600 depicting a method according to the present invention. The method(s) and associated process(es) are now discussed, over the course of the following paragraphs, with extensive reference to FIG. 4, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The display module 107 provides the preparation and presentation of the projected image within the viewable environment of the projector 112. Through the functions and abilities of the projector 112, the display module 107 is able to display one or more projected image on the surfaces and foreground/background features that have been analyzed and determined by the map processing module 106. Through the surfaces and features, the display module 107 is able to determine the adjustments required for the projected image, and the projected image which can be displayed based on these surfaces and features.

In step 602, the display module 107 populates the reconstructed 3D depth map with specific surfaces and foreground/background features and additional elements to create an accurate 3D rendering of the viewable environment. Through the computing device 110, the display module 107 detects the surfaces and foreground/background features and provides these areas to the user through the computing device 110. Through providing the surfaces and features and the ability of the projector 112 to the user, the user is able to select an image to display on the various surfaces and features which are possible based on the limitations of the projector 112. In some embodiments, and based on the projector 112, the projected image may be limited. In some embodiments, the user is provided with a rendering of the viewable environment through the computing device 110 and they are able to select each surface and feature and select which projected image is displayed on the various surfaces and features.

In a viewable environment where there are multiple surfaces and foreground/background (e.g. features), the user is presented with a visual depiction of each feature which the projector 112 is able to interact with or through. The user is able to select one or more of the features to customize the display or imagery which is projected onto the feature(s).

In step 604, the display module 107 displays the projected image(s). Once the user has selected the desired feature for the projected image to interact with. The display module 107 communicates with the projector 112 to generate the projected image and through and map processing module 106 alterations to the projected image, when projected on the features, regardless of the location of the projector 112, the projected image is proportionate.

In some embodiments, a preview of the projected images is shown on the computing device 110 for the user to select, edit, modify, remove, or add, additional projected images. The projector 112 is able to receive the overall display and operate independently of the computing device 110. In some embodiments, the displays are HTML websites, with CSS, JavaScript and WebGL, which allows for many visual effects and communication with e.g. external sources. In some embodiments, there are distinct display files: Projection onto one or multiple planar surfaces are handled using the CSS transform property with a matrix3d( ) value holding the appropriate homography transformation. 3D animated effects on complex geometries are done using WebGL contexts with GLSL shaders. The corresponding (segmented) depth map is referenced and used by the shader program.

FIG. 8 depicts an altered illustration of the calculated space, according to an embodiment of the present invention. Shown in FIG. 8 is an image of the space prior to the map processing module 106 analyzing the space. In the depicted environment, there are multiple surfaces at various distances from the project 112. The surfaces are also in along different walls and at various heights.

FIG. 9 depicts an illustration of the calculated space 900, according to an embodiment of the present invention. In the depicted embodiment, the map processing module 106 calculates the depth of the viewable spaces, which is visualized in FIG. 9 by the gradient scale, wherein the farthest visible/projectable surfaces from the project 112 is darkest, with the closest points the lightest. In various embodiments, the gradient scale may be altered or reversed. Through an application or user interface, a user is able to see this depiction of the space to help visual how far certain projections will be from the source. In some embodiments, if a surface is to far from the project, the depiction may have the surface blacked out to show the user that the space is not usable.

FIG. 10 depicts an altered illustration of the calculated space 1000 depicted various surfaces, according to an embodiment of the present invention. In the depicted embodiment, the map processing module 106 has identified various surfaces 1005, 1010, and 1015 for exemplary purposes. Map processing module 106 may identify more surfaces, surfaces that are a minimum size or shape, surfaces that a minimum or maximum distance from the project 112, or the like based on predetermined limitations of maximums for which the project 112, map processing module 106, or the display module 107 can handle. The surfaces identified have been processed for the size, surface irregulates, distance from the projector 112, and the like so that the display module 107 is able to properly display a projection that is scaled correctly.

FIG. 11 depicts an altered illustration of a space 1100 depicted foreground/background features, according to an embodiment of the present invention. In the present embodiment, the map processing module 106 is identifying the foreground surfaces 1101 and the background 1102. This is used in situations where the projected image is designed to show depth or makes use of the foreground and the background. In additional embodiments the map processing module 106 can identify specific viewable surfaces at different depth to create a projected image that incorporates the depth of the various viewable surfaces. Thereby creating a projected image with a depth field The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer implemented method for projecting an image, comprising:
   providing an electronic device, wherein the electronic device has an image sensing component, a processing component, and a projecting component;
   capturing, by one or more processors, at least one image of an environment within visible space of the projecting component of the electronic device;
   generating, by one or more processors, a depth map of the visible space of the environment;
   altering, by one or more processors, the visible space based on the limitations of the projecting component of the electronic device;
   identifying, by one or more processors, planar regions within the altered visible space;
   receiving, by one or more processors, a selected image to be projected on a selected planar region of the altered visible space;
   analyzing, by one or more processors, the selected planar region based on the depth map to determine a set of modifications to be made to an image which is selected to be projected onto the selected planar region, wherein the projected image is a proportionate across the selected planar region;
   manipulating, by one or more processors, the selected image that is to be projected on to the selected planar region based on the generated depth map of the visible space relative to the selected planar region, wherein the selected image is manipulated based on the generated depth map so that the perspective of the selected image accounts for the depth mapping of the selected planar region, and wherein the selected image is manipulated based on an intended perspective view based on the depth map; and
   projecting, by one or more processors, the image on the portion of the selected planar region.

2. The computer-implemented method of claim 1, further comprising, identifying, by one or more processors, foreground and background of the visible space, wherein obstructions are identified in the visible space.

3. The computer-implemented method of claim 1, wherein the captured environment is identified based on predetermined geometric shapes and spaces.

4. The computer-implemented method of claim 1, further comprising; calculating, by one or more processors, the planar regions' surfaces and position, wherein each identified pixel compares values to a proximate pixel to generate the depth map.

5. A computer program product for projecting an image, the computer program product comprising a computer readable storage medium having program instructions embodied therewith, the program instructions executable by a computing device to cause the computing device to:
   provide an electronic device, wherein the electronic device has an image sensing component, a processing component, and a projecting component;
   program instructions to capture at least one image of an environment within the visible space of the projecting component of the electronic device;
   program instructions to identify foreground and background of the visible space based on the at least one captured image of the environment;
   program instructions to generate an illustrative depth map of the visible space of the environment, wherein planar regions of the environment which are accessible are identified, and wherein inaccessible regions of the illustrative depth map are identified;
   program instructions to receive a selected image to be projected on to a selected planar region;
   program instructions to manipulate the selected image based on the generated depth map so that the selected image is manipulated for a proper perspective; and
   program instructions to command the electronic device to project the manipulated selected image on the planar region.

6. The computer program product of claim 5, further comprising; program instructions to analyze the identified planar regions, wherein the-planar regions are analyzed to set forth a set of manipulations which be applied to a selected image to be projected onto the planar regions based on a predetermined perspective set by the depth map.

7. The computer program product of claim 5, wherein a plurality of images are projected on the identified at least one planar regions, and each of the plurality of images are scaled based on the generated depth map relative to the identified planar regions.

8. The computer program product of claim 5, wherein the captured environment is identified based on predetermined geometric shapes and spaces.

9. The computer program product of claim 5, further comprising; program instructions to calculate the planar regions' surfaces and position, wherein each identified pixel compares values to a proximate pixel to generate the depth map.

10. A computer system for projecting an image, the computer program product comprising:
    one or more computer processors, one or more computer readable storage media, and program instructions stored on the one or more computer readable storage media for execution by, at least one of the one or more processors, the program instructions comprising:
    provide an electronic device, wherein the electronic device has an image sensing component, a processing component, and a projecting component;
    program instructions to capture at least one image of an environment within the visible space of the projecting component of the electronic device;
    program instructions to generate a depth map of the visible space of the environment, wherein the depth map identifies planar regions based on the projecting component of the electronic device and is able to identify foreground and background;
    program instructions to analyze the visible space for predetermined geometric shapes and space;
    program instructions to identify planar regions of the visible space, wherein the planar regions are analyzed for a set of properties and characteristics;
    program instructions to apply a set of manipulations to each of the identified planar regions which are to be applied to a selected image which is to be projected onto each of the planar regions;

program instructions to receive the selected image and the selected planar region to project the selected image;

program instructions to alter the selected image based on the set of manipulations specific to that planar region, wherein the selected image is manipulated to be proportionate based on an intended viewer's position; and program instructions to project the selected image on the selected planar region.

11. The computer-implemented method of claim 1, wherein the planar regions are adjustable in size and shape, and wherein when the size and shape of the planar region is adjusted a set of manipulations to be applied to the selected image is modified based on a new set of parameters for the adjusted planar region.

12. The computer-implemented method of claim 1, further comprising; identifying, by one or more processors, a viewable zone, wherein portions of the visible space are voided which are not accessible by the projecting component.

\* \* \* \* \*